United States Patent [19]
Suzuki et al.

[11] Patent Number: 5,464,361
[45] Date of Patent: Nov. 7, 1995

[54] METHOD OF MAKING FIBER TERMINATION

[75] Inventors: Nobuo Suzuki; Osamu Murata, both of Tokyo, Japan

[73] Assignee: Seiko Instruments Inc., Japan

[21] Appl. No.: 708,887

[22] Filed: May 31, 1991

[30] Foreign Application Priority Data

Jun. 5, 1990 [JP] Japan .................................. 2-147019

[51] Int. Cl.⁶ ...................................................... B24B 1/00
[52] U.S. Cl. .................................. 451/28; 451/41; 451/42
[58] Field of Search ......................... 51/121, 122, 123 R, 51/124 R, 281 R, 283 R, 323, 324, 328; 385/54, 76, 59, 78

[56] References Cited

U.S. PATENT DOCUMENTS

| | | | |
|---|---|---|---|
| 4,264,127 | 4/1981 | Schumacher et al. | 350/96.2 |
| 4,303,304 | 12/1981 | Ruiz | 350/96.2 |
| 4,330,171 | 5/1982 | Malsot | 385/80 |
| 4,362,356 | 12/1982 | Williams | 385/80 |
| 4,458,454 | 7/1984 | Barnett | 51/328 |
| 4,492,060 | 1/1985 | Clark | 51/283 R |
| 4,695,124 | 9/1987 | Himono | 385/78 |
| 4,721,357 | 1/1988 | Kovalchick et al. | 350/96.2 |
| 4,729,624 | 3/1988 | Kakii | 385/78 |
| 4,839,993 | 6/1989 | Masuko | 51/124 R |
| 4,850,664 | 7/1989 | Iri et al. | 350/96.2 |
| 4,877,303 | 10/1989 | Caldwell et al. | 350/96.21 |

FOREIGN PATENT DOCUMENTS

| | | |
|---|---|---|
| 0262770 | 4/1988 | European Pat. Off. . |
| 0264976 | 4/1988 | European Pat. Off. . |
| 2002141 | 2/1979 | United Kingdom . |
| 2049220 | 12/1980 | United Kingdom . |

*Primary Examiner*—Maurina T. Rachuba
*Attorney, Agent, or Firm*—Adams & Wilks

[57] ABSTRACT

In a method of making an optical fiber termination which includes a ferrule consisting of a cylindrical pipe having a through hole at the center, the ferrule is finished in advance to a convex spherical surface. After the optical fiber inserted into and fixed to the ferrule, the end surfaces of the ferrule and the optical fiber are together ground and shaped.

17 Claims, 4 Drawing Sheets

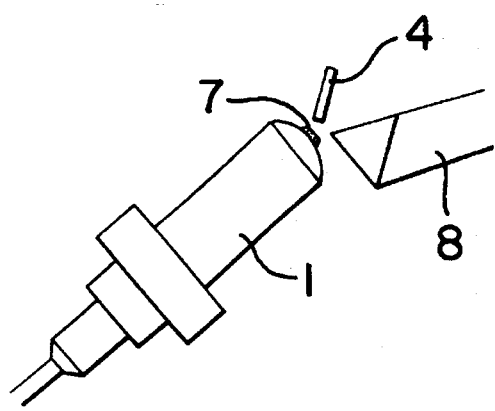
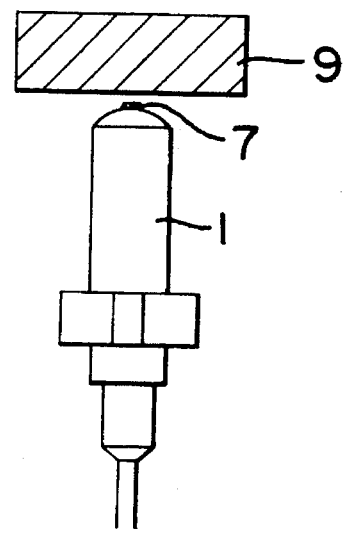
FIG. 3(a)          FIG. 3(b)
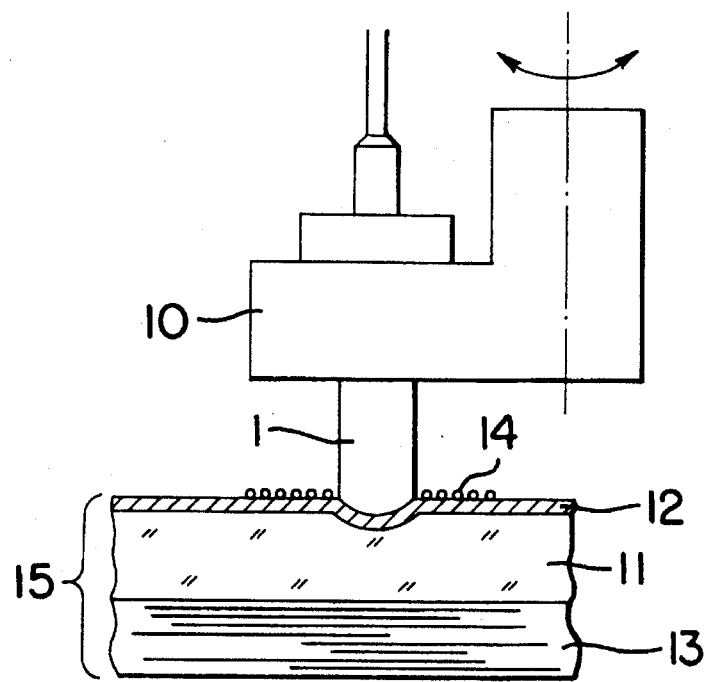
FIG. 4

METHOD OF MAKING FIBER TERMINATION

BACKGROUND OF THE INVENTION

This invention relates to a method of making an optical fiber termination, the optical fiber being secured in a ferrule.

To connect optical fibers with each other, it is generally known to employ a method which fixes the optical fibers 101, 102 into cylindrical rod-like ferrules 103, 104 by use of adhesive, inserts them into a hollow cylindrical alignment sleeve 108, and butts the end surfaces of the optical fibers 101, 102 against each other, as shown in FIG. 7. The end surface of each ferrule 103, 104 and the end surface of each optical fiber 101, 102 are together ground to a convex spherical plane 107 having its apex on the center axis 106 of the optical fiber.

However, in order to shape this convex spherical surface 107, a plurality of grinding steps ranging from rough grinding to finish grinding are necessary. Therefore, this method involves the following problems throughout all the grinding steps:

(1) The ground surfaces must have the same radius of curvature; and (2) It is extremely difficult to bring the central axis of each ferrule 103, 104, that is, the central axis of each fiber 101, 102, into conformity with the apex of the convex spherical surface.

Further, because the ferrule 103, 104 having the fiber 101, 102 fixed thereto is made of ceramic material and metal material or is made fully of ceramic material, it has high hardness. Since the end surfaces are broad, too, grinding of these surfaces takes a long time in finish grinding and grains extracted in a grinding pan during the grinding operation damage the end surfaces of the fiber 101, 102. Accordingly, a method which is entirely satisfactory in mass-producibility and finish accuracy has not yet been put into practice.

When the fibers 101, 102 are fixed into the ferrules 103, 104, adhesive flowing out from the ends of the ferrules 103, 104 adheres to and hardens on the end surfaces of the ferrules and degradation of the quality of the finished surfaces and damage of the end surfaces occur depending on the amount and shape of the adhesive. Furthermore, this adhesive increases remarkably the necessary finishing time.

SUMMARY OF THE INVENTION

It is an object of the present invention to provide a method of an optical fiber termination which can solve the various problems described above by simple means for fixing fibers inside ferrules and grinding them.

Therefore, according to the present invention, advance the end surface of the ferrule constructed as a single body having a small aperture (through-hole) on its center axis is shaped so that the small bore is in conformity with the apex of a convex spherical surface of the end surface of the ferrule, then an optical fiber is fixed into the small bore of the ferrule by adhesive, and thereafter only the optical fiber projecting from the end of the ferrule is ground so that the optical fiber has the same end surface as the ferrule does.

BRIEF DESCRIPTION OF THE DRAWINGS

FIGS. 2(a)-(c) and 3(a) and (b) are perspective views showing pre-treatment steps and post-treatment steps when an optical fiber is fitted into the predomed ferrule in accordance with the present invention;

FIG. 4 is a sectional view showing a method of grinding the end surface;

DETAILED DESCRIPTION OF THE INVENTION

Next, the present invention will be explained in detail with reference to one embodiment thereof.

Figure 1:
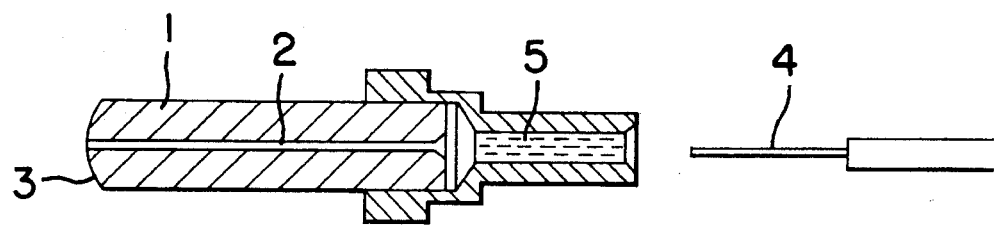
FIG. 1 is a sectional view of a predomed ferrule in accordance with the present invention before the insertion of an optical fiber.

FIG. 1 shows a state that an optical fiber is not inserted yet into a predomed ferrule as an embodiment of the present invention. In order to bring the center of the radius of curvature at the end of the ferrule into conformity with the center axis of the optical fiber, the end of the ferrule is subjected beforehand to end surface grinding so that the apex of a convex spherical surface 3 is in alignment with the center of a small bore 2 positioned on the center axis of the ferrule 1. Hereinafter, such a ferrule which is subjected to convex spherical surface machining will be referred to as a "predomed ferrule 1". Generally, the radius of curvature is set to 20 mm or 60 mm. This convex spherical surface machining has a great feature in that mass-producibility and machining accuracy can be improved because machining may be carried out in a state where the fiber 4 is not yet assembled, because preparation and setting of machining jigs and works becomes extremely easy to handle, because uniformity in the radius of curvature can be obtained since machining is made by rotating the ferrule, and because the small bore 2 and the spherical surface 3 can be aligned with high accuracy.

Next, adhesive 5 is filled into this predomed ferrule 1 or the adhesive 5 is applied to the optical fiber 4 and then the optical fiber 4 is fitted into the predomed ferrule 1. Thereafter the adhesive is set thermally. In this instance, in order to carry out efficiently the next step, i.e., grinding, it is very important how to determine the size and shape of the adhesive layer which is formed around the fiber which is exposed on the end surface portion of the ferrule after heat-set.

Figure 2A:
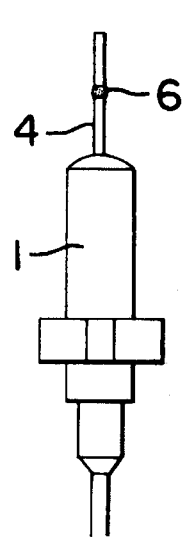
Figure 2B:
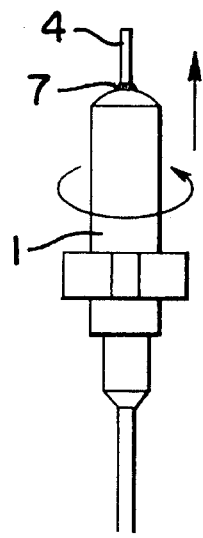
Figure 2C:
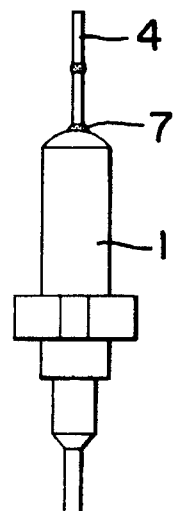

Namely, if the amount of the adhesive layer is large, a longer time is necessary for removing the adhesive layer but if the amount is too small, on the contrary, cracks and chips will occur in the fiber at the time of grinding and excellent assembly cannot be made. Accordingly, the adhesive is applied to the end surface of the ferrule by the steps of filling the adhesive into the ferrule, fitting then the optical fiber into the ferrule in such a manner as to project its end from the end of the ferrule, applying again a very small amount of the adhesive 5 in the form of beads 6 having diameters of 1 mm$\phi$ or below to the side surface of the exposed fiber 4 near the end of the ferrule as shown in FIG. 2(a) and causing this bead-like adhesive 6 to adhere to the end surface of the ferrule by moving axially back and forth a fiber 4 in the piston-like motion inside the ferrule 1 or by rotating or turning the ferrule (FIG. 2(b)). In this manner, a predetermined amount of adhesive layer 7 can always be applied in such a manner as to cover the fiber on the end surface of the ferrule (FIG. 2(c)).

The final step is a grinding step of the optical fiber 4 as shown in FIG. 3. A bare fiber 4 projecting from the adhesive layer 7 on the end surface of the ferrule is cut and removed with a cutter 8, or the like, before grinding. Then, the end surface of the ferrule is rubbed several times on a coarse grind stone 9 so as to remove any fins and projections that occur at the time of cutting of the fiber and to bring the fiber 4 and the adhesive layer 7 into substantially the same plane.

After this pre-treatment is completed, the predomed ferrule 1 having the optical fiber fixed into it is set to a grinding jig 10 and orthogonal grinding is made with the adhesive layer 7 adhering to the fiber 4 and to its surrounding portions. FIG. 4 shows the grinding method of the end surface of the ferrule in accordance with the present invention. The ferrule 1 clamped by the jig 10 is pressed against a grinder 15 made by bonding an elastic member 11 and a thin plastic film 12 to a base 13, and the grinder 15 undergoes somewhat concave deformation due to the pressure of the end of the ferrule. The grinder 15 is rotated in this state and the ferrule is rubbed by the grinder in cooperation with the rocking motion of the fitting jig 10 to the right and left.

As grinding proceeds, the optical fiber 4 and the adhesive 7 covering the surrounding portions thereof are removed gradually and while grinding proceeds toward the fiber 4 at the center of the ferrule, the spherical shape of the end surface of the ferrule is not affected adversely. Grinding is completed when the fiber 4 and the ferrule 1 have the same end surface.

It is effective to apply firstly coarse abrasive 14 and then fine abrasive and the grinder is exchanged as a whole at that time.

FIG. 5 shows a typical example of the characteristics of an optical connector assembled by the embodiment described above.

Figure 5A:
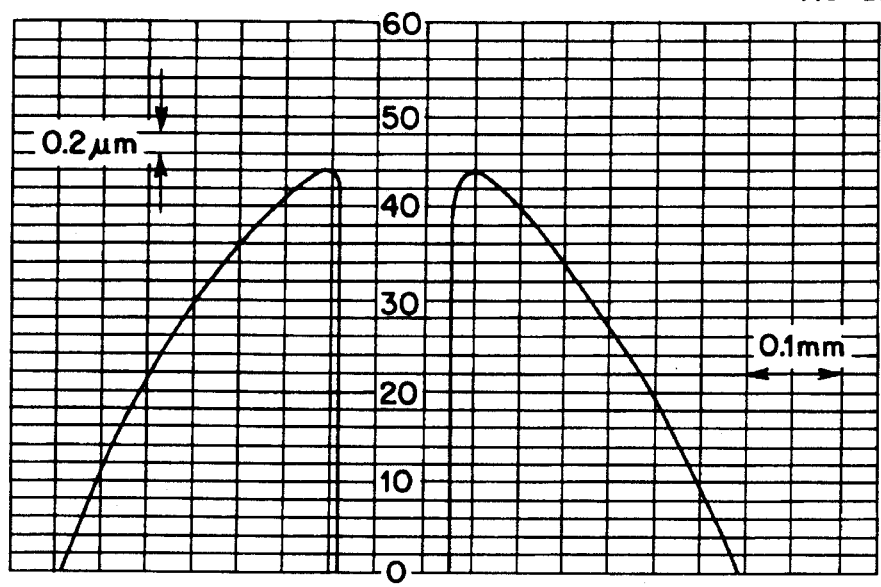
FIG. 5 shows the shapes of the end surface of the predomed ferrule before, when, and after the optical fiber is fitted.
Figure 5B:
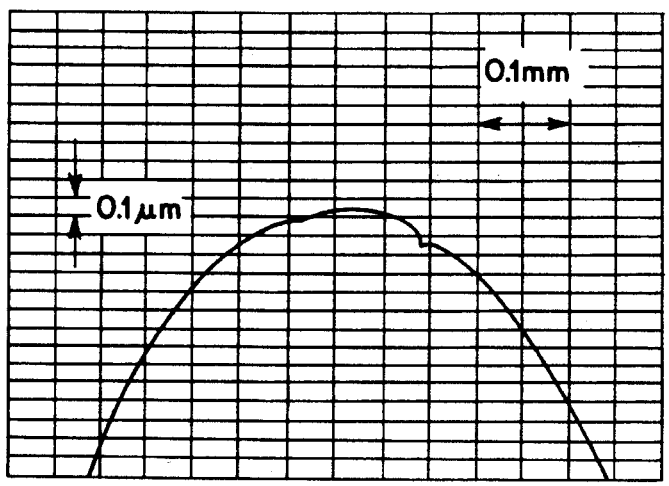

FIG. 5(a) shows the end shape of the predomed ferrule having an end shape having a radius of curvature of 20 mm before the insertion of the optical fiber. FIG. 5(b) shows the end surface shape of the optical fiber connector plug after the end surface shaping by use of this predomed ferrule in accordance with the method of the present invention. An epoxy type adhesive is used as the bead-like adhesive 6 and the diameter is set to about 500 mm.

As can be seen from these drawings, grinding is so performed that the shapes near the end surfaces of both the fiber and ferrule have substantially the same spherical surface and is a convex spherical one with the fiber, which is positioned at the center of the ferrule, being at the apex. Grinding is hereby carried out twice. In the first step, diamond powder having a grain size of 2–6 μm is used, and in the finishing step diamond powder having a grain size of 1 μm or below is used, and the grinding plate is exchanged as a whole. The total time required for grinding was as short as 80 sec and the occurrence of damages on the end surface of the fiber, etc, was confirmed to be extremely less.

Figure 6A:
FIGS. 6(a) and (b) are diagrams showing the typical optical characteristics of a connector which is assembled in accordance with the present invention.
Figure 6B:
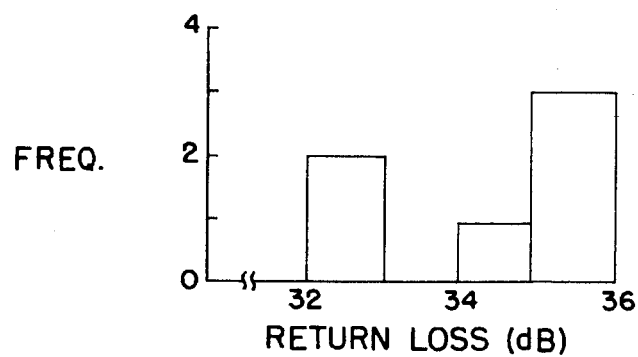
Figure 7:
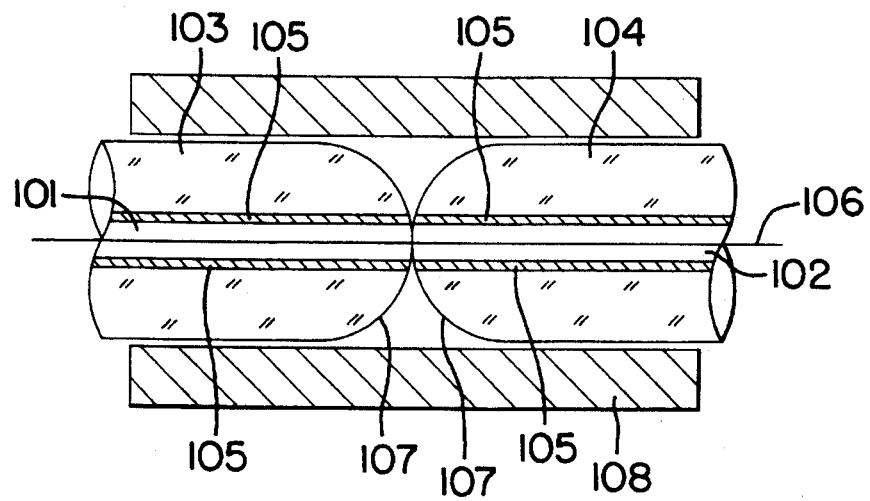
FIG. 7 is a sectional view showing the structure of a connector obtained by a conventional assembling method.

FIG. 6 shows the optical characteristics of the optical connector produced by the assembling described above. According to the above, the characteristics such as a connection loss of up to 0.2 dB and a reflection damping quantity of 34 dB on an average, that are superior or equivalent to the characteristics by the conventional assembling method, can be obtained.

Though the description has been made with respect to an embodiment using a predomed ferrule, the same effect can be obtained naturally by applying the present invention to the conventional ferrules, that is, those ferrules whose end surfaces are finished at right angles, that is, the end surfaces are a plane surface perpendicular to the center axis of said ferrule.

In accordance with a method of making an optical fiber termination using the predomed ferrule described above, simple machining jigs can be used and it is easy to prepare and set works and obtain uniformity in the radius of curvature since machining may be carried out in a state where the fiber is not yet assembled. Since the fiber is ground after being inserted into the ferrule and fixed by adhesive in the ferrule which is subjected beforehand to end surface grinding and has a convex spherical end surface, the grinding operation does not deteriorate the precise radius of curvature at the end of the predomed ferrule and the positioning accuracy of alignment between the center axis of the ferrule (i.e. the center axis of the fiber) and the apex of the spherical surface.

Further, since only the optical fiber projecting from the end surface of the ferrule is grinded, there are no grains extracted from the ferrule during the grinding operation which may damage the end surface of the fiber, and the grinding time is extremely shortened. Further, according to the present invention, it is possible to obtain an optical fiber termination having a good quality of finished end surface without damage by efficient grinding process with the steps of setting the amount of the adhesive covering a bare fiber near the end surface of the ferrule to a predetermined amount by using a pertinent quantity of adhesive and adhesive process, and grinding orthogonally the fiber while removing the adhesive on the surrounding portions.

As described above, according to the present invention, an optical fiber termination with higher performance can be obtained as compared with conventional method of making the optical fiber termination, and the handling property in shaping the end surface of the optical fiber can be improved drastically.

What is claimed is:

1. A method of making an optical fiber termination which is secured in a ferrule, which comprises the steps of:

providing a ferrule comprised of a cylindrical pipe having a center axis and a through-hole extending along the center axis;

finishing an end surface of said ferrule to a convex spherical surface having a center of radius of curvature at the center axis of said ferrule;

then fixing an optical fiber in the through-hole of said ferrule; and then grinding and shaping the end surfaces of said ferrule and optical fiber together until said optical fiber attains the same convex spherical shape as that of the end surface of said ferrule.

2. A method according to claim 1; wherein said fixing step comprises the steps of:

filling an adhesive into said ferrule before inserting said optical fiber into said ferrule;

inserting said optical fiber into said ferrule;

applying an adhesive in a bead-like form to a side surface of said optical fiber exposed from the end surface of said ferrule;

forming said bead-like adhesive into an adhesive layer on the end surface of said ferrule; and setting said adhesive thermally.

3. A method of connecting an optical fiber to a ferrule, comprising the steps:

providing a ferrule having a through-hole having a center axis;

imparting a convex spherical surface to an end of the ferrule with the apex of the convex spherical end surface being aligned with the center axis of the through-hole;

inserting an optical fiber through the through-hole of the ferrule such that an end portion of the optical fiber projects beyond the convex spherical end surface of the ferrule and then fixing the optical fiber to the ferrule; and grinding the projecting end of the fixed optical fiber until the end surface thereof has the same convex spherical shape as the convex spherical end surface of the ferrule.

4. A method according to claim 3; wherein the imparting step comprises machining the end of the ferrule to impart thereto a convex spherical surface.

5. A method according to claim 4; wherein the machining of the end of the ferrule comprises grinding the end of the ferrule.

6. A method according to claim 3; wherein the fixing step comprises applying adhesive to the optical fiber to adhere the same to the ferrule.

7. A method according to claim 6; wherein the applying adhesive includes applying a quantity of adhesive to the projecting end of the optical fiber, and then effecting relative movement between the optical fiber and the ferrule to transfer the adhesive to the surfaces of the optical fiber and the ferrule in the immediate vicinity of the convex spherical end surface of the ferrule.

8. A method according to claim 7; wherein the effecting relative movement is carried out to cover the surface of the optical fiber with adhesive in the immediate vicinity of the convex spherical surface of the ferrule.

9. A method according to claim 8; wherein the effecting relative movement is carried out by moving the optical fiber axially back and forth relative to the ferrule.

10. A method according to claim 9; wherein the effecting relative movement is carried out by turning the ferrule relative to the optical fiber.

11. A method according to claim 8; wherein the effecting relative movement is carried out by turning the ferrule relative to the optical fiber.

12. A method according to claim 7; wherein the imparting step comprises machining the end of the ferrule to impart thereto a convex spherical surface.

13. A method according to claim 12; wherein the machining of the end of the ferrule comprises grinding the end of the ferrule.

14. A method according to claim 3; including cutting off all but a small part of the projecting end of the fixed optical fiber near the convex spherical end surface of the ferrule prior to the grinding step.

15. A method according to claim 3; wherein the grinding step comprises pressing the end surface of the ferrule against an elastic grinding material while moving the grinding material relative to the ferrule to grind the projecting end of the optical fiber.

16. A method according to claim 15; wherein the grinding is carried out without adversely affecting the finished convex spherical shape of the end surface of the ferrule.

17. A method according to claim 15; wherein the grinding material is rotated while in pressing contact with the ferrule end surface and concurrently therewith the ferrule is rocked back and forth.

* * * * *